Aug. 19, 1958  W. BURSTYN  2,847,854
ARRANGEMENT FOR MEASURING A MECHANICAL EFFECT
Filed May 8, 1956

Inventor:
Walther Burstyn

United States Patent Office 2,847,854
Patented Aug. 19, 1958

2,847,854

ARRANGEMENT FOR MEASURING A MECHANICAL EFFECT

Walther Burstyn, Hennigsdorf, near Berlin, Germany

Application May 8, 1956, Serial No. 583,592

2 Claims. (Cl. 73—134)

For measuring the mechanical power of a motor or the like it is necessary to evaluate on the one hand the torque absorbed e. g. by the brake, on the other hand the speed of the motor shaft, and to multiply both values with each other.

The torque may be measured by means of a balance (preferably a spring balance) being attached to the secondary side of the brake and shifting the slider of a potentiometer, the partial voltage of the latter thus indicating the torque, whilst the speed may be measured by the voltage of a permanent magnet dynamo driven by the same shaft. The multiplication of both currents is performed by a wattmeter fed by both currents.

This method is rather complicated and not fit for remote measuring. It is much easier to employ the method according to the present invention. It is based upon a speed meter I have invented in 1910 (DRP 239.123) consisting of an interrupter driven by the rotating shaft of the motor and alternately charging a condenser once or several times per revolution to a constant voltage and discharging it through a current meter, the latter thus indicating the velocity.

According to the present invention the condenser is charged not to a constant voltage but to the partial voltage of a potentiometer operating as disclosed above. Thus, the current delivered by the discharged condenser is proportional to the product of torque and velocity, that is to the power of the motor.

Figure 1:
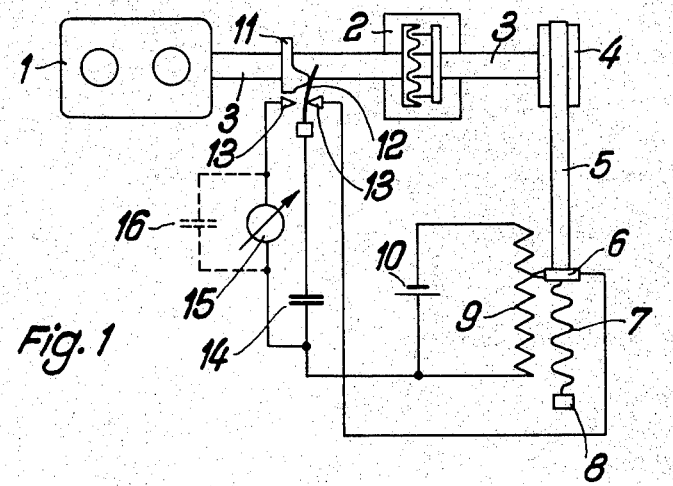

In the drawing Fig. 1 shows an example how to perform the invention. 1 represents a combustion-engine the power of which is to be measured. It drives a hydraulic brake 2 of a well known art the action of which is adjusted by filling it with more or less water. The secondary shaft 3 of that brake carries a disc 4 on which is wound up a thin metallic band 5 the free end of which is provided with a contact piece 6 and connected with the upper end of a balance spring 7, the other end of which is fixed to a block 8. The contact piece 6 slides along a potentiometer 9 fed by a constant current source 10. Thus, the voltage of the lower portion of the potentiometer indicates the counter-force developed by brake 2.

The motor shaft carries furthermore an excenter 11 pressing a contact spring 12 alternately to the left or right contact of a contact pair 13, in this way forming a commutator alternately charging the condenser 14 to the partial voltage of the potentiometer 9 and discharging it through a current meter 15. Therefore the latter indicates the power of the motor 1. The meter 15 may be shunted by a large storage condenser 16 in order to smooth the current impulses.

Instead of the spring commutator 12, 13 a rotating commutator may be used. The hydraulic brake may be replaced by a friction brake, especially for lower energies. In order to make the exactness of the arrangement independent of the inconstancy of the mains voltage 10 a ballast resistance may be put in series to the potentiometer.

Figure 2:
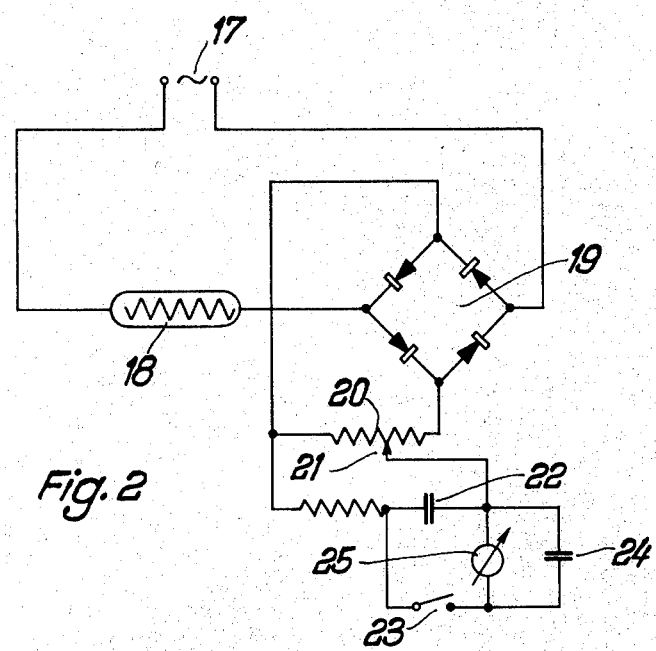

In Fig. 2 the arrangement is supposed to be fed by alternating current mains 17. A ballast resistance 18 is connected in series with a rectifier arrangement 19, the latter feeding a potentiometer 20. The partial voltage of 20 defined by the position of the slider 21 loads the condenser 22. A switch 23 is, like the commutator 12, 13 of Fig. 1, driven by the motor shaft. It discharges periodically, once or more per revolution of the motor, the condenser 22 through the current meter 25 which may be shunted by a storage condenser 24.

The simple scheme of Fig. 2 operates, of course, less negligible if the open period of the switch is made long and the resistance of the loading circuit high in comparison to the closed period and the resistance of the discharge circuit.

The arrangement according to the invention is also fit for measuring the power of a person turning a crank or of a horse driving a capstan, both for physiological purposes.

What I claim is:

1. In an arrangement for measuring the power output of a motor driving a dynamometer brake, in combination a potentiometer, a source of constant voltage connected across the end terminals of the potentiometer resistance, means connected to the dynamometer for shifting the potentiometer slider in accordance with the torque developed by said motor, switch means driven by said motor shaft at a rate proportional to shaft speed, a circuit including a condenser and a current measuring instrument, said switch means being connected in said circuit to alternately connect said condenser between the slider and one end of the potentiometer resistance and then to the current measuring instrument.

2. In an arrangement for measuring the power output of a motor driving a dynamometer brake, in combination a potentiometer, a source of constant voltage connected across the end terminals of the potentiometer resistance, means connected to the dynamometer for shifting the potentiometer slider in accordance with the torque developed by said motor, a condenser connected between said slider and one terminal of said potentiometer resistance, switch means driven by said motor shaft at a rate proportional to shaft speed, a circuit including said condenser and a current measuring instrument, said switch means being connected in said circuit to periodically discharge said condenser through said measuring instrument.

References Cited in the file of this patent

UNITED STATES PATENTS

| 955,988 | Osburn | Apr. 26, 1910 |
| 979,503 | Johnson | Dec. 27, 1910 |
| 2,455,247 | Griest | Nov. 30, 1948 |
| 2,751,553 | McEntee | June 19, 1956 |
| 2,759,355 | Boyle | Aug. 21, 1956 |

FOREIGN PATENTS

| 390,904 | Great Britain | Apr. 20, 1933 |